United States Patent
Roy et al.

(10) Patent No.: US 9,762,523 B1
(45) Date of Patent: Sep. 12, 2017

(54) ENHANCED COMMUNICATION OF ELECTRONIC REMINDERS

(75) Inventors: Ashutosh Roy, Los Altos, CA (US);
Ian Jones, Leighton Buzzard (GB);
Peter Dove, Hungerford (GB)

(73) Assignee: EGAIN COMMUNICATIONS, Mountain View, CA (US)

( * ) Notice: Subject to any disclaimer, the term of this patent is extended or adjusted under 35 U.S.C. 154(b) by 424 days.

(21) Appl. No.: 13/100,183

(22) Filed: May 3, 2011

Related U.S. Application Data

(60) Provisional application No. 61/330,836, filed on May 3, 2010.

(51) Int. Cl.
*G06F 15/16* (2006.01)
*H04L 12/58* (2006.01)

(52) U.S. Cl.
CPC .................................. *H04L 51/24* (2013.01)

(58) Field of Classification Search
CPC ....... H04L 29/06; H04L 67/42; H04L 69/329;
H04L 67/22; H04L 67/125; H04L 67/26;
H04L 67/2842; H04L 67/18; H04L
12/1895; H04L 1/1607; H04L 45/24;
H04L 51/04; H04L 12/5695; H04L
12/5865; H04L 65/403; H04L 67/306;
H04L 51/24; H04L 63/107; H04L 43/10;
H04L 51/12; H04L 67/02; H04L 67/141;
H04L 12/1831; H04L 12/2441
USPC ......... 455/457; 709/206, 203, 216–219, 227, 709/232, 249; 715/771
See application file for complete search history.

(56) References Cited

U.S. PATENT DOCUMENTS

| | | | |
|---|---|---|---|
| 8,266,231 B1* | 9/2012 | Golovin et al. | 709/206 |
| 2004/0078436 A1* | 4/2004 | Demsky et al. | 709/206 |
| 2007/0033256 A1* | 2/2007 | Ben-Itzhak | 709/206 |
| 2007/0143499 A1* | 6/2007 | Chang | 709/245 |
| 2008/0005250 A1* | 1/2008 | Oksum | 709/206 |
| 2008/0046834 A1* | 2/2008 | Yu et al. | 715/771 |
| 2008/0082651 A1* | 4/2008 | Singh | G06Q 10/109 709/224 |
| 2008/0201440 A1* | 8/2008 | Shah et al. | 709/206 |
| 2008/0301296 A1* | 12/2008 | York | 709/225 |
| 2009/0210148 A1* | 8/2009 | Jayanthi | 701/206 |
| 2011/0177830 A1* | 7/2011 | Clipsham | 455/456.3 |
| 2012/0129510 A1* | 5/2012 | Bradburn | G06Q 10/1093 455/418 |
| 2012/0203849 A1* | 8/2012 | Collins et al. | 709/206 |

* cited by examiner

*Primary Examiner* — Brian J Gillis
*Assistant Examiner* — Thao Duong

(57) ABSTRACT

A method, computer-readable medium and system for providing automatic or electronic reminders are disclosed. An attribute associated with a task may be used in combination with information about a user to provide an electronic reminder to the user for the task at a relevant or appropriate time to enable the task to be completed. As such, at least one attribute associated with a task and information about a user may be used to automatically determine a time for communicating an electronic reminder to the user.

18 Claims, 10 Drawing Sheets

200

| | 201 | 202 | 203 | 204 | 205 | 206 | 207 | 208 |
|---|---|---|---|---|---|---|---|---|
| | Task ID | Task Description | Creator | Attribute(s) | Assignee(s) | Shared With | Category | Status |
| | 1 | Attend 10AM meeting with Bill | User 1 | "10AM" "Bill" | | | Work | Incomplete |
| 211 | 2 | Remind Tom about project deadline of 3PM today | User 1 | "Tom" "project" "3PM" | | | Work | Completed |
| | 3 | Pay DMV registration | User 1 | "DMV" "registration" | | | Personal | Incomplete |
| 212 | 4 | Fix faucet | User 2 | "faucet" | User 1 | | Personal | Completed |
| 213 | 5 | Get milk from store | User 1 | "milk" "store" | | User 2 | Personal Store | Incomplete |
| 214 | 6 | Get eggs from store | User 2 | "eggs" "store" | | User 1 | Personal Store | Incomplete |
| | 7 | Finish math homework | User 1 | "math" "homework" | User 3 | | | Incomplete |
| 215 | 8 | Finish chores | User 1 | "chores" | User 3 | User 2 | | Completed |

| Task Identifier: | 410 |
| Task Description: | 420 |
| Category: | 430 |

User-Defined Attributes

| Associate Person: | 440 |
| Associate Location: | 445 |

| Assign Task To: | 450 |

| Share Task With: | 460 |

Completed ☐ — 470

490 — Cancel     480 — Done

| User 1 |||||
|---|---|---|---|---|

My Tasks:

| | Completed? | Tasks | Shared With: | Assigned From: |
|---|---|---|---|---|
| 510 | ✓ ✓ | Attend 10AM meeting with Bill<br>Remind Tom about project deadline of 3PM today<br>Pay DMV registration<br>Fix faucet<br>Get milk from store<br>Get eggs from store | User 2<br>User 2 | User 2 |
| | 514 | 511 | 512 | 513 |

Tasks Assigned To Others:

| | Completed? | Tasks | Assigned To: | Shared With: |
|---|---|---|---|---|
| 520 | ✓ | Finish math homework<br>Finish chores | User 3<br>User 4 | User 2 |
| | 524 | 521 | 522 | 523 |

REMINDER

On your way home from work, complete the following tasks:

810 {
1) Pay DMV registration
2) Get milk from store
3) Get eggs from store
}

Snooze
820

Dismiss
830

NOTIFICATION

User 3 Completed The Following Task:

910 { Finish Chores

ENHANCED COMMUNICATION OF ELECTRONIC REMINDERS

RELATED APPLICATIONS

The present application claims the benefit of U.S. Provisional Patent Application No. 61/330,836, filed May 3, 2010, entitled "INTELLIGENT REMINDER MANAGEMENT SYSTEM," naming Ashutosh Roy as the inventor. That application is incorporated herein by reference in its entirety and for all purposes.

BACKGROUND OF THE INVENTION

Conventional solutions for providing automatic or electronic reminders require users to manually enter information into an electronic device about a task associated with the reminder. For example, a title for the task as well as the time at which the reminder should occur are entered by a user. The reminder is then automatically displayed on a display screen of a computer system or portable electronic device at the user-entered time to remind the user of the task to be completed.

Although conventional solutions may convey a reminder to a user, the reminder often occurs at an inconvenient or inappropriate time. For example, a personal reminder that is to be dealt with after work hours may be inconveniently displayed during the day while the user is at work. As a result, many reminders are often ignored and forgotten about.

SUMMARY OF THE INVENTION

Accordingly, a need exists to improve the communication of electronic reminders for prescribed tasks. More specifically, a need exists to improve the timing of electronic reminders so that the tasks associated with the reminders can be completed. Embodiments of the present invention provide novel solutions to these needs and others as described below.

Embodiments of the present invention are directed to a method, computer-readable medium and system for providing automatic or electronic reminders. More specifically, an attribute associated with a task (e.g., a person or organization involved with the task, a place of the task, etc.) may be used in combination with information about a user (e.g., a location of the user at a given time, another user that the user is in communication with at a given time, etc.) to provide an electronic reminder (e.g., an electronic reminder message) to the user for the task at a relevant or appropriate time to enable the task to be completed. For example, if a task is to discuss a matter with a person (e.g., the attribute may be the name or other identifier of the person), then the electronic reminder may be provided to the user while the user is in communication with (e.g., currently emailing, instant messaging, talking on the phone to, etc.) that person to enable the user to discuss the matter with the person. As another example, if the reminder is to pay the registration fee for an automobile (e.g., the attribute may be "DMV," "car registration," etc.), then the electronic reminder may be provided to the user while the user is in proximity to the DMV to enable the user to physically go into the DMV to pay the car registration fee. In this manner, electronic reminders may be geographically triggered in one embodiment. As such, at least one attribute associated with a task and information about a user may be used to automatically determine a time for communicating an electronic reminder to the user.

Embodiments of the present invention also enable electronic reminders to be provided for tasks that are assigned and/or shared. For example, where a parent creates a task that is subsequently assigned to a child, a reminder may be provided to the child at a determined time (e.g., based on an attribute associated with the task and information about the child) to enable the child to complete the task. As another example, where tasks associated with purchasing items from the grocery store are shared by a plurality of users, a reminder for the tasks may be sent to each user sharing the task at a determined time (e.g., based on an attribute associated with the task and information about a given user) to enable the tasks to be completed by one or more of the plurality of users.

Feedback may be provided to one or more users indicating that a task has been completed. For example, where a task is assigned from a first user to a second user, a communication (e.g., email, text message, instant message, etc.) may be sent to the first user indicating that the second user has completed the task. As another example, where at least one task is shared by a plurality of users and subsequently completed by a first user, a communication (e.g., email, text message, instant message, etc.) may be sent to at least one other user of the plurality of users indicating that the first user has completed the task.

In one embodiment, a method of providing electronic reminders includes accessing an attribute associated with a task. Information associated with a first user may be accessed. The method may also include automatically determining, based on the attribute and the information, a time for communication of an electronic reminder to the first user. Communication of the electronic reminder to the first user at the time may be initiated, wherein the electronic reminder is associated with completion of the task.

In another embodiment, a computer-readable medium may have computer-readable program code embodied therein for causing a computer system to perform a method of providing electronic reminders. And in yet another embodiment, a system may include a processor and a memory, wherein the memory includes instructions that when executed by the system implement a method of providing electronic reminders.

BRIEF DESCRIPTION OF THE DRAWINGS

The present invention is illustrated by way of example, and not by way of limitation, in the figures of the accompanying drawings and in which like reference numerals refer to similar elements.

FIG. 2 shows an exemplary memory-stored data structure including information about at least one task in accordance with one embodiment of the present invention.

FIG. 4 shows an exemplary on-screen graphical user interface for entering information associated with a task in accordance with one embodiment of the present invention.

FIG. 5 shows an exemplary on-screen graphical user interface for displaying information associated with one or more tasks for the management thereof in accordance with one embodiment of the present invention.

FIG. 8 shows an exemplary on-screen graphical user interface for providing a plurality of reminders to a user in accordance with one embodiment of the present invention.

FIG. 9 shows an exemplary on-screen graphical user interface for notifying at least one user of one or more tasks completed by at least one other user in accordance with one embodiment of the present invention.

DETAILED DESCRIPTION OF THE INVENTION

Figure 1:
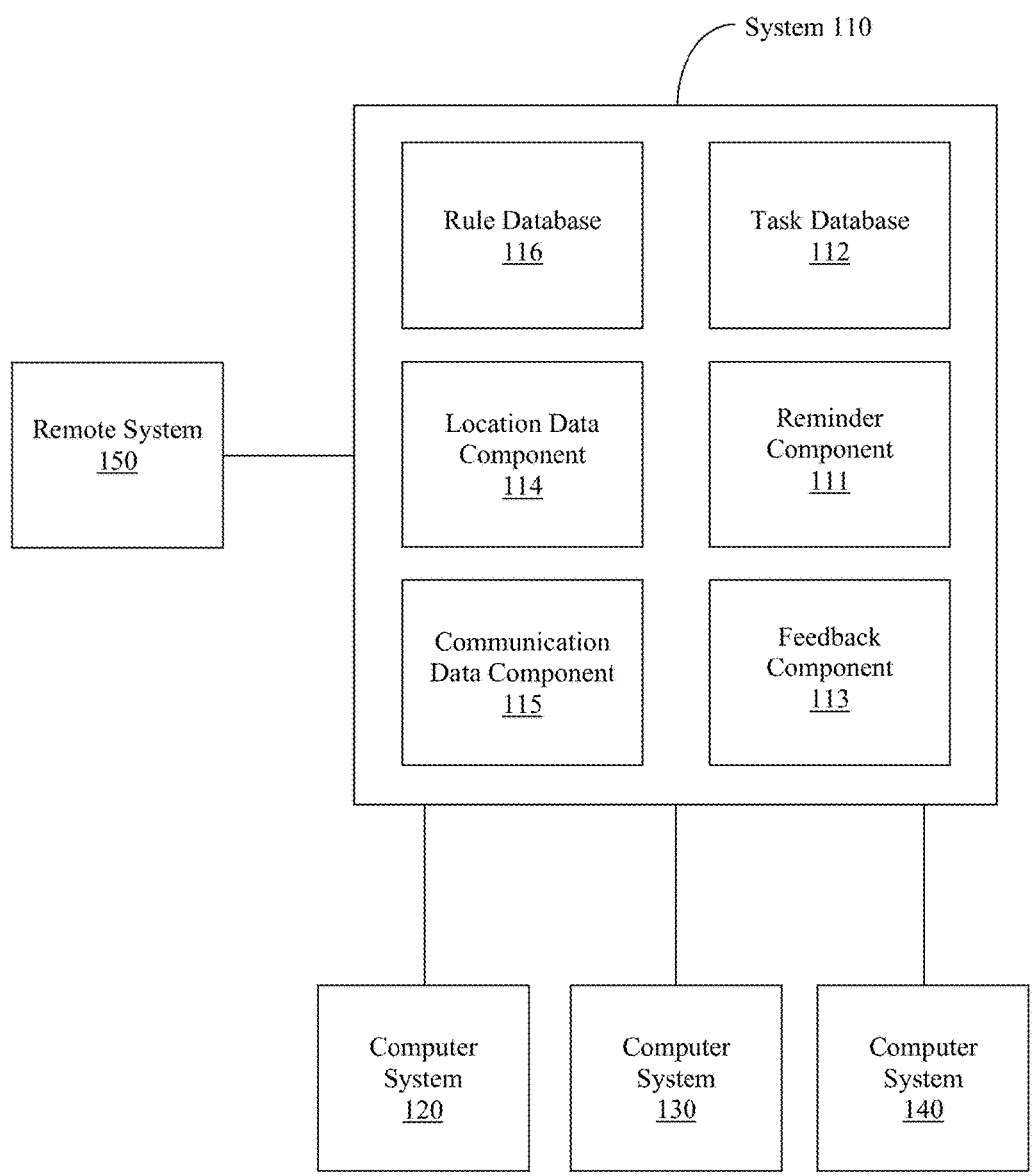
FIG. 1 shows an exemplary system for providing automatic or electronic reminders in accordance with one embodiment of the present invention.

Reference will now be made in detail to embodiments of the present invention, examples of which are illustrated in the accompanying drawings. While the present invention will be discussed in conjunction with the following embodiments, it will be understood that they are not intended to limit the present invention to these embodiments alone. On the contrary, the present invention is intended to cover alternatives, modifications, and equivalents which may be included with the spirit and scope of the present invention as defined by the appended claims. Furthermore, in the following detailed description of the present invention, numerous specific details are set forth in order to provide a thorough understanding of the present invention. However, embodiments of the present invention may be practiced without these specific details. In other instances, well-known methods, procedures, components, and circuits have not been described in detail so as not to unnecessarily obscure aspects of the present invention.

Notation and Nomenclature

Some regions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing the terms such as "aborting," "accepting," "accessing," "adding," "adjusting," "analyzing," "applying," "assembling," "assigning," "balancing," "blocking," "calculating," "capturing," "combining," "comparing," "collecting," "creating," "debugging," "defining," "depicting," "detecting," "determining," "displaying," "establishing," "executing," "filtering," "flipping," "generating," "grouping," "hiding," "identifying," "initiating," "interacting," "modifying," "monitoring," "moving," "outputting," "performing," "placing," "presenting," "processing," "programming," "querying," "ranking," "removing," "repeating," "resuming," "sampling," "simulating," "sorting," "storing," "subtracting," "suspending," "tracking," "transcoding," "transforming," "unblocking," "using," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the Invention

FIG. 1 shows exemplary system 100 for providing automatic or electronic reminders in accordance with one embodiment of the present invention. As shown in FIG. 1, system 110 may be used to send reminders or reminder messages to one or more users (e.g., of computer system 120, computer system 130, computer system 140, etc.) for completing one or more tasks. In one embodiment, a time for sending a reminder may be determined (e.g., by reminder component 111) based on an attribute associated with a task and information about a user (e.g., a location of the user at a given time, another user that the user is in communication with at a given time, etc.). The reminder may subsequently be communicated (e.g., by reminder component 111) to the user (e.g., of computer system 120, computer system 130, computer system 140, etc.) at the determined time, thereby improving the timing of the reminder so that the task associated with the reminder can be completed by the user.

In one embodiment, tasks may be defined by a user. For example, a graphical user interface (e.g., GUI 400 of FIG. 4) may be used to enter information about each task such as a task identifier, a task description, a user-defined attribute (e.g., a person associated with the task, a location associated with the task, etc.), another user that the task is to be assigned to, another user that the task is to be shared with, etc. In one embodiment, the GUI may be displayed using a computer system (e.g., 120, 130, 140, etc.) in communication with system 110. Information about the tasks (e.g., entered using the GUI) may be stored in a task database (e.g., 112 of FIG. 1) in one embodiment.

As another example, information about a task may be entered by a user using a multimedia interface (e.g., including an audio input device, optical input device, some combination thereof, etc.). For example, the user may speak or otherwise input the information via the multimedia interface, where the information may include a task identifier, a task description, a user-defined attribute (e.g., a person associated with the task, a location associated with the task, etc.), another user that the task is to be assigned to, another user that the task is to be shared with, etc.

FIG. 2 shows exemplary memory-stored data structure 200 including information about at least one task in accordance with one embodiment of the present invention. In one embodiment, data of task database 112 may be stored in accordance with data structure 200.

As shown in FIG. 2, column 201 of data structure 200 may include a respective task identifier for each task. The task identifier may be a number, letter, word, or any other type of identifier. The task identifier may be entered by a user (e.g., using a GUI such as GUI 400 of FIG. 4, using a multimedia interface, etc.), defined automatically (e.g., by reminder component 111 based upon an order of entry, etc.), etc.

Column 202 may include a respective task description for each task. The task description may be entered by a user (e.g., using a GUI such as GUI 400 of FIG. 4, using a multimedia interface, etc.). The user entering the task description, or otherwise defining the task, may be indicated in column 203 which includes a respective creator or owner for each task. In one embodiment, the creator of a given task may be automatically identified (e.g., by reminder component 111) and stored in task database 112.

As shown in FIG. 2, column 204 includes one or more respective attributes associated with each task. In one embodiment, an attribute may be user-defined. For example, a user may enter an attribute (e.g., a person and/or location) associated with a task using an on-screen GUI (e.g., such as GUI 400 of FIG. 4). As another example, a user may enter an attribute (e.g., a person and/or location) associated with a task using a multimedia interface.

Alternatively, an attribute may be automatically determined (e.g., by reminder component 111). For example, a task description may be automatically parsed (e.g., using phrase chunking or any other well known process) to determine an attribute. As shown in row 211, the task description of "remind Tom about project deadline of 3 PM today" may be automatically parsed to extract the following attributes: "Tom," "project" and "3 PM." In one embodiment, one or more of these attributes may be used to improve the timing of electronic reminders (e.g., as discussed herein) by, for example, triggering an electronic reminder while communicating with Tom, triggering an electronic reminder while at a location associated with the project (e.g., where Tom may be located), triggering an electronic reminder before 3 PM, etc.

As shown in FIG. 2, column 205 includes at least one respective user to whom each task has been assigned. It should be appreciated that certain tasks may not have been assigned, and therefore, assignment data in column 205 may not exist (e.g., depicted by a blank) for the unassigned tasks. For example, the task "fix faucet" (e.g., in row 212) was created by "User 2" (e.g., the "assignor") and assigned to "User 1" (e.g., the "assignee"), thereby assigning responsibility for completing the task to "User 1." In one embodiment, the assignor or assignors of a task may be free of responsibility for completing the task after assignment thereof (e.g., shifting responsibility for completion of the task to the assignee or assignees of the task). In one embodiment, an electronic reminder associated with an assigned task may only be sent to the user responsible for completing the task. Alternatively, a reminder associated with an assigned task may be sent to the user responsible for completing the task as well as the creator of the task.

Column 206 includes at least one respective user with whom each task has been shared. It should be appreciated that certain tasks may not have been shared, and therefore, data related to sharing of a task in column 206 may not exist (e.g., depicted by a blank) for the tasks that have not been shared. For example, the task "get milk from store" (e.g., in row 213) was created by "User 1" and shared with "User 2." As another example, the task "get eggs from store" (e.g., in row 214) was created by "User 2" and shared with "User 1." In one embodiment, any user sharing a task may complete the task. And in one embodiment, an electronic reminder associated with a shared task may be sent to all of the users sharing the task or less than all of the users sharing the task.

It should be appreciated that tasks may be both assigned and shared. For example, the task "finish chores" (e.g., in row 215) may be created by "User 1," assigned to "User 3," and shared with "User 2." In this manner, the task may be completed by either "User 3" (since it was assigned from "User 1" to "User3") or "User 2" (since it was shared with "User 2"). In one embodiment, all three users may receive a reminder to complete the task. Alternatively, just "User 3" and "User 2" (e.g., the users responsible for completing the task) may be set a reminder.

As shown in FIG. 2, column 207 includes at least one respective category for each task that has been assigned a category. A category may be assigned to a task by a user (e.g., using a GUI such as GUI 400 of FIG. 4, using a multimedia interface, etc.) and/or automatically (e.g., based on a portion of the task description, based on one or more attributes associated with the task, etc.). In one embodiment, a time for sending an electronic reminder may be determined based at least in part (e.g., alone or in combination with at least one attribute and/or information about the user) on a category assigned to a task. For example, if it is known that a user is at work, then only reminders associated with the category "work" may be sent (e.g., and reminders associated with the category "personal" may be blocked or not sent). As another example, if it is known that a user is at or near a store, then reminders associated with the category "store" may be communicated to the user.

Column 208 may include a respective status for each task. For example, the tasks corresponding to rows 211, 212 and 215 are completed, while the tasks corresponding to the other rows of data structure 200 are incomplete. In one embodiment, the status of a task may be updated or changed automatically (e.g., by feedback component 113 of FIG. 1) responsive to a completion of a task.

In one embodiment, the information in column 208 may be used to provide feedback (e.g., by feedback component 113 of FIG. 1) to a user on the status of a task. For example, where a plurality of users is sharing tasks related to grocery shopping, each user may receive a notification message (e.g., a visual message via a GUI, an audio message, etc.) responsive to one of the other users completing a task. In this manner, duplication of effort related to completing tasks can be reduced, thereby enabling a group of users to more efficiently complete shared tasks.

Turning back to FIG. 1, location information about a user may be provided by location data component 114 (e.g., to reminder component 111 for determining a time for sending a reminder). The location information may be accessed from a component of a computer system (e.g., 120, 130, 140, etc.), where the component may include a global positioning system (GPS), a component capable of otherwise determining a location of the computer system (e.g., by determining a cell that the computer system is located in, by triangulating the position of the computer system using cell towers or some other process, etc.), etc.

In one embodiment, the location of a computer system may be determined (e.g., by location data component 114) using information from remote system 150. Remote system 150 may determine a user's real-time location (e.g., the location of computer system 120, computer system 130, computer system 140, etc.) using information entered by a user (e.g., similar to Foursquare), using information communicated from a computer system (e.g., similar to Facebook Places), some combination thereof, etc. In one embodiment, remote system 150 may be owned and/or operated by an entity that is different from an entity associated with one or more other components of system 100.

Communication information about a user may be provided by communication data component 115 (e.g., to reminder component 111 for determining a time for sending a reminder). The communication information may be accessed from a component of a computer system (e.g., 120, 130, 140, etc.), where the component may indicate at least one other user (or computer system) that is communicating with the computer system at a particular instant and/or a type of communication being used (e.g., email, text message, phone call, instant message, etc.).

In one embodiment, communication information may be accessed from remote system 150. For example, where remote system 150 is used to route or otherwise send communications (e.g., emails, text messages, phone calls, instant messages, etc.), information related to the communications (e.g., sender, recipient, time of transmission, etc.) may be accessed, e.g., by communication data component 115.

In one embodiment, reminder component 111 may send electronic reminders in accordance with one or more rules of rule database 116. For example, a reminder for the task associated with row 212 may be sent based on a first rule (e.g., if attribute is "faucet," then trigger reminder if user is within 10 miles of a plumbing store) and/or a second rule (e.g., only send reminders associated with the category "personal" after 5 PM). As such, if both the first and second rules are applied, then an electronic reminder would not be sent if the user were to pass by a plumbing store before 5 PM (e.g., during a work-related trip). Conversely, a reminder would be sent if the user were to pass by the pluming store after 5 PM (e.g., on the way home from work). In this manner, reminder component 111 may apply one or more rules to other data (e.g., at least one attribute accessed from task database 112, information about a user accessed from location data component 114, information about a user accessed from communication data component 115, at least one category accessed from task database 112, other data, some combination thereof, etc.) to determine a time for sending a reminder to a user.

In one embodiment, a compound rule (e.g., including a plurality of conditions) may be used to determine information (e.g., at least one time, at least one recipient, etc.) for sending one or more electronic reminders. For example, a compound rule may indicate that a reminder should be sent to a user for a task of "review son's homework" when the user is at home and when the user is in proximity to the user's son. In this manner, reminders may be triggered based on compound rules involving a plurality of conditions combined with Boolean logic.

In one embodiment, rules (e.g., of rule database 116) may be defined and/or configured by a user. For example, a user may use a GUI to define one or more conditions for triggering a reminder. As another example, a user may use a multimedia interface to define one or more conditions for triggering a reminder.

Although FIG. 1 depicts system 100 with a certain number and arrangement of components, it should be appreciated that system 100 may include a different number and/or arrangement of components in other embodiments. For example, system 110 may be implemented by one or more of the computer systems (e.g., 120, 130, 140, etc.), and therefore, one or more of the computer systems (e.g., used to implement system 110) may communicate directly (e.g., over the Internet or other communication path) with remote system 150. In this case, system 110 may be executed by the one or more computer systems as an application, plug-in module, etc.

Although FIG. 2 depicts data structure 200 as including a certain amount of data and type of data, it should be appreciated that data structure 200 may include a different amount and/or type of data in other embodiments. Additionally, although FIG. 2 depicts data structure 200 as including a certain arrangement of data, it should be appreciated that data structure 200 may include a different arrangement of data in other embodiments.

Figure 3:
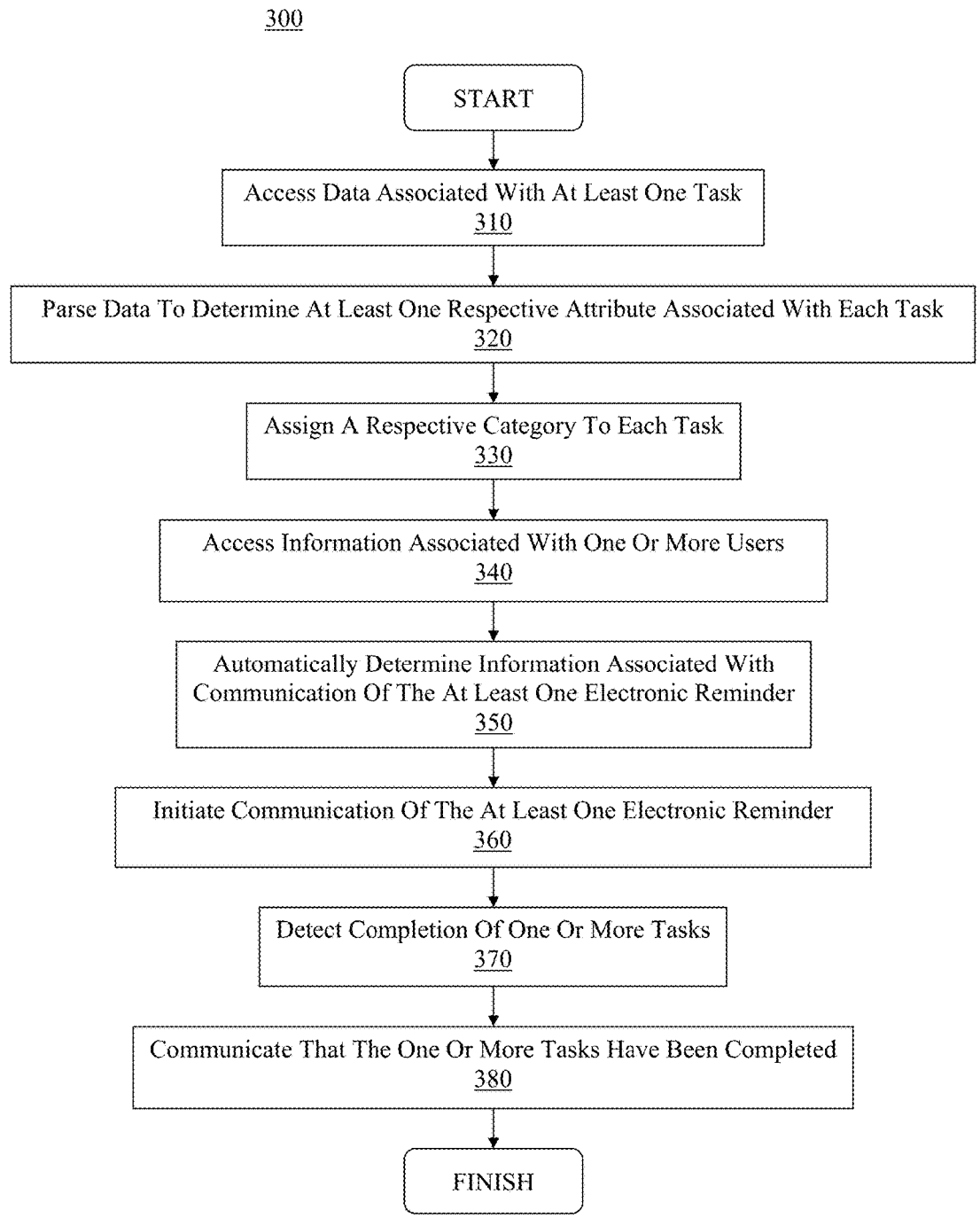
FIG. 3 shows a flowchart of an exemplary computer-implemented process for providing automatic or electronic reminders in accordance with one embodiment of the present invention.

FIG. 3 shows a flowchart of exemplary computer-implemented process 300 for providing automatic or electronic reminders in accordance with one embodiment of the present invention. As shown in FIG. 3, step 310 involves accessing data associated with at least one task. For example, step 310 may involve accessing a task identifier, a task description, a user-defined attribute (e.g., a person associated with the task, a location associated with the task, etc.), another user that the task is to be assigned to, another user that the task is to be shared with, some combination thereof, etc. In one embodiment, step 310 may involve accessing data entered via a GUI (e.g., 400 of FIG. 4), entered via a multimedia interface (e.g., including an audio input device, optical input device, some combination thereof, etc.), some combination thereof, etc.

Step 320 involves parsing the data (e.g., accessed in step 310) to determine at least one respective attribute associated with each task. In one embodiment, one or more attributes may be determined in step 320 by performing phrase chunking or another well known process on the data (e.g., the task description entered by a user, other data, etc.). For example, the task description of "remind Tom about project deadline of 3 PM today" may be parsed to extract the following attributes: "Tom," "project" and "3 PM."

As shown in FIG. 3, step 330 involves assigning a respective category to at least one task. In one embodiment, a category may be automatically determined based on the data accessed in step 310. For example, where the task description of "remind Tom about project deadline of 3 PM today" is accessed in step 310, a category of "work" may be assigned to the task based on information determined from the data (e.g., that Tom is work colleague, deadlines are usually associated with work tasks and not personal tasks, the term "project" is more commonly used to refer to items at work, etc.). Alternatively, the category may be assigned based on a category selected and/or input by a user (e.g., using GUI 400 of FIG. 4, using a multimedia interface, etc.).

Step 340 involves accessing information associated with one or more users. For example, location information about a user (e.g., expressed in terms of coordinates, an identifier of a cell that the user is in, an identifier of a cell tower that the user is in, etc.) may be accessed (e.g., from location data component 114, from remote system 150, etc.) in step 340. As another example, communication information about a user may be accessed (e.g., from communication data component 115, from computer system 120, from computer system 130, from computer system 140, from remote system 150, etc.) in step 340. The communication information may include a name or identifier of at least one other user that the user is in communication with, a time of the communication, etc.

As shown in FIG. 3, step 350 involves automatically determining information associated with communication of at least one reminder. The information (e.g., at least one time for communicating the at least one reminder, at least one recipient of the at least one reminder, etc.) may be determined (e.g., by reminder component 111) in step 350 by applying other information to at least one rule (e.g., from rule database 116). The other information may include at least one respective attribute associated with each task (e.g., determined in step 320, entered by user, etc.), information about one or more users (e.g., accessed in step 340), at least one respective category associated with each task (e.g., assigned in step 330), some combination thereof, etc.

For example, if a task involves reminding a co-worker about a deadline, then step 350 may involve determining a time at which the user (e.g., an intended recipient of a reminder) is located near the co-worker (e.g., determined based on location information accessed in step 340) and/or is in communication with the co-worker (e.g., determined based on communication information accessed in step 340). It should be appreciated that a time determined in step 350 may be a current time (e.g., at real-time) or any time in the future (e.g., 2 minutes from now, an hour from now, tomorrow, next week, etc.).

As another example, if a task is of a personal nature (e.g., assigned to a "personal" category in step 330), then step 350 may involve determining a time at which the user (e.g., an intended recipient of a reminder) is not at work. For example, if the user typically leaves work at 5 PM, then the time determined in step 350 may be sometime after 5 PM. As another example, if the task involves getting an item from a grocery store (e.g., determined to be of a personal nature and assigned to a "personal" category in step 330) and it is known that the user typically leaves work at 5 PM, then step 350 may involve determining a time after 5 PM when the user is near or at the grocery store.

Step 350 may also involve determining one or more recipients of a reminder. For example, if the task has not been assigned (e.g., determined based on a query of task database 112), then the creator of the task (e.g., determined based on a query of task database 112) may be determined to be a recipient of a reminder. As another example, if the task has been assigned (e.g., determined based on a query of task database 112), then the assignee or assignees of the task (e.g., determined based on a query of task database 112) may be determined to be a recipient or recipients of a reminder. In one embodiment, if the task has been assigned, then the creator of the task may not be determined to be a recipient of a reminder in step 350. And as yet another example, if the task has been shared with one or more other users (e.g., determined based on a query of task database 112), then the one or more other users with whom the task is shared may be determined to be a recipient or recipients of a reminder.

As shown in FIG. 3, step 360 involves initiating communication of the at least one electronic reminder or electronic reminder message. In one embodiment, communication of the at least one reminder may be initiated (e.g., by reminder component 111) in accordance with the information (e.g., the time or times, the recipient or recipients, etc.) determined in step 350. Responsive thereto, the at least one reminder may be communicated (e.g., from system 110) to one or more users (e.g., to computer system 120, to computer system 130, to computer system 140, some combination thereof, etc.) so that the at least one task associated with the at least one reminder can be completed by the one or more users.

In one embodiment, the at least one reminder may be displayed (e.g., as part of an on-screen GUI as shown in, for example, FIG. 7, FIG. 8, FIG. 9, etc.) on a display device of a computer system (e.g., 120, 130, 140, etc.). As such, step 360 may involve generating data (e.g., image data, code, etc.) to enable or cause the reminder to be displayed at the recipient device or devices.

In one embodiment, the at least one reminder may be audibly rendered (e.g., as an alert) by an audio output device (e.g., a speaker, etc.) of a computer system (e.g., 120, 130, 140, etc.). As such, step 360 may involve generating data (e.g., audio data, etc.) to enable or cause the electronic reminder to be delivered with an audible rendition at the recipient device or devices. In one embodiment, different sounds may be rendered for different tasks, different types of information about a user (e.g., accessed in step 340) causing the reminder to be communicated and/or triggered, etc.

As shown in FIG. 3, step 370 involves detecting completion of one or more tasks. In one embodiment, completion of one or more tasks may be detected (e.g., by feedback component 113) based on information input by a user (e.g., using GUI 400 of FIG. 4 indicating that at least one task has been completed, using a multimedia interface indicating that at least one task has been completed, etc.). In one embodiment, completion of one or more tasks may be automatically detected in step 370. For example, where a computer system (e.g., 120, 130, 140, etc.) is used to complete a task, the computer system may automatically detect completion of the task and/or communicate the completion to system 110 (e.g., enabling system 110 in step 370 to detect that the task has been completed).

Step 380 involves communicating a message indicating that the one or more tasks have been completed. In one embodiment, the message may cause the automated display of a notification message (e.g., as shown in FIG. 9) at the recipient device and/or an updating of a GUI listing at least one task (e.g., as shown in FIG. 5) at the recipient device. In one embodiment, the message may cause the automated rendition of an audible message at one or more recipient devices.

In one embodiment, the message (e.g., indicating that the one or more tasks have been completed) may be sent (e.g., by feedback component 113) in step 380 to the user that completed the one or more tasks. In one embodiment, the message (e.g., indicating that the one or more tasks have been completed) may be sent (e.g., by feedback component 113) in step 380 to at least one user other than the user that completed the one or more tasks. For example, where multiple users are sharing the one or more tasks, a respective message may be sent to each of the users sharing the one or more tasks responsive to a completion of the one or more tasks (e.g., so that the one or more tasks are not subsequently duplicated by any of the users sharing the one or more tasks). As another example, where the one or more tasks have been assigned from one user to at least one other user, a message may be sent to the user that assigned the one or more tasks responsive to a completion of the one or more tasks (e.g., by one or more of the at least one other user).

FIG. 4 shows exemplary on-screen GUI 400 for entering information associated with a task in accordance with one embodiment of the present invention. As shown in FIG. 4, region 410 may be used to enter a task identifier (e.g., a name, number, letter, etc.). Region 420 may be used to enter a description for a task (e.g., including one or more words, letters, numbers, etc.).

Region 430 may be used to enter a category for the task. For example, a category of "personal" may be entered for tasks of a personal nature, a category of "work" may be entered for work-related tasks, etc. In one embodiment, a category may be automatically determined (e.g., based on the description entered in region 420) and displayed in region 430 (e.g., as a suggestion to the user), where the user may use region 430 to confirm the suggested category, change the category, add an additional category, etc.

As shown in FIG. 4, on-screen region 440 may be used to enter at least one person or user associated with the task. In one embodiment, the person or user entered in region 440 may be included in the task description (e.g., "Tom" is included in the task description of "remind Tom about project deadline of 3 PM today"). In one embodiment, the person or user entered in region 440 may not be expressly included in the task description (e.g., the task description of "pay for teeth cleaning" does not expressly include the word "dentist" or the name of a dentist).

On-screen region 445 may be used to enter at least one location associated with the task. For example, region 445 may be used to select a previously-stored location (e.g., a particular address previously entered by a user, a location on a map previously selected by a user, etc.). As another example, region 445 may be used to enter an address or other information (e.g., a name, identifier, etc.) about a location. And as yet another example, region 445 may be used to display a map and enable a user to select a location on the map (e.g., by clicking or otherwise interacting with a region of the map).

As shown in FIG. 4, region 450 may be used to identify at least one user to assign the task to. For example, the at least one user may be selected from a list of users (e.g., accessed from the user's contacts, associated with an organization that the user is also associated with, etc.). As another example, the name or other information about the at least one user may be entered into region 450.

On-screen region 460 may be used to identify at least one user to share the task with. For example, the at least one user may be selected from a list of users (e.g., accessed from the user's contacts, associated with an organization that the user is also associated with, etc.). As another example, the name or other information about the at least one user may be entered into region 460.

As shown in FIG. 4, region 470 may be used to indicate that the task has been completed. For example, after the task has been defined (e.g., using regions 410 through 460) and completed, GUI 400 may be recalled to enable the user to indicate that the task has been completed (e.g., by interacting with region 470). In one embodiment, where the task has been shared with one or more other users (e.g., selected and/or identified using region 460), a communication may be sent (e.g., responsive to an interaction with region 470) to the one or more other users indicating that the task has been completed.

On-screen region 480 may be used to save information entered using another region of GUI 400 (e.g., region 410, region 420, region 430, region 440, region 445, region 450, region 460, region 470). For example, responsive to a user interaction with region 480, information entered using GUI 400 may be saved (e.g., in task database 112), a task may be assigned to one or more users (e.g., selected and/or identified using region 450), a task may be shared with one or more other users (e.g., selected and/or identified using region 460), a communication may be sent (e.g., to one or more other users sharing the task) indicating that a task has been completed (e.g., if region 470 has been used to indicate that the task has been completed), etc.

As shown in FIG. 4, region 490 may be used to cancel the entry of information in GUI 400. In one embodiment, an interaction with region 490 may cause data entered using GUI 400 to be erased or deleted.

In one embodiment, one or more regions of GUI 400 depicted in FIG. 4 may include one or more respective form fields (e.g., a text entry box, drop-down list box, radio button, etc.). The one or more respective form fields may be used to make selections or otherwise enter information.

Although FIG. 4 depicts regions of GUI 400 with specific sizes and shapes, it should be appreciated that GUI 400 may include regions of different sizes and/or shapes in other embodiments. Additionally, although FIG. 4 depicts a specific number and arrangement of regions, it should be appreciated that GUI 400 may include a different number and/or arrangement of regions in other embodiments. Further, although GUI 400 has been described as enabling at least one specific user input (e.g., information such as a task identifier, a task description, a user-defined attribute, another user that the task is to be assigned to, another user that the task is to be shared with, etc.), it should be appreciated that one or more of the at least one user input may be input via a multimedia interface (e.g., alone or in combination with GUI 400) in other embodiments.

FIG. 5 shows exemplary on-screen GUI 500 for displaying information associated with one or more tasks for the management thereof in accordance with one embodiment of the present invention. GUI 500 may include region 510 and region 520. Region 510 shows information about tasks of a user (e.g., tasks that "User 1" is responsible for completing), whereas region 520 shows information about tasks of one or more other users (e.g., that have been assigned to one or more other users and/or that "User 1" is not responsible for completing).

As shown in FIG. 5, column 511 of region 510 includes a listing of tasks for a user. In one embodiment, respective information for each task displayed in column 511 may correspond to and/or be displayed based on a task description entered by the user (e.g., using region 420 of GUI 400) and/or stored in a task database 112 (e.g., in column 202).

Column 512 includes one or more users that a task is shared with. For example, the tasks "get milk from store" and "get eggs from store" may be shared with another user (e.g., "User 2"). In one embodiment, information displayed in column 512 may correspond to and/or be displayed based on information entered by the user (e.g., using region 460 of GUI 400) and/or stored in a task database 112 (e.g., in column 206).

As shown in FIG. 5, column 513 of region 510 includes one or more users that a task is assigned from. For example, the task "fix faucet" may be assigned from another user (e.g., "User 2"). In one embodiment, information displayed in column 513 may correspond to and/or be displayed based on information entered by the user (e.g., using region 450 of GUI 400) and/or stored in a task database 112 (e.g., in column 203 and/or 205).

Column 514 includes an indication of whether one or more tasks have been completed. For example, the check marks displayed in column 514 may indicate that the tasks "remind Tom about project deadline of 3 PM today" and "fix faucet" have been completed. In one embodiment, information displayed in column 514 may correspond to and/or be displayed based on information entered by the user (e.g., using region 470 of GUI 400) and/or stored in task database 112 (e.g., in column 208).

As shown in FIG. 5, column 521 of region 520 includes a listing of tasks assigned to at least one other user (e.g., listed in column 522). In one embodiment, respective information for each task displayed in column 521 may correspond to and/or be displayed based on a task description entered by the user (e.g., using region 420 of GUI 400) and/or stored in a task database 112 (e.g., in column 202).

Column 522 includes an indication of one or more users that a task is assigned to (e.g., from "User 1"). For example, the task "finish math homework" may be assigned to "User 3." As another example, the task "finish chores" may be assigned to "User 4." In one embodiment, information displayed in column 522 may correspond to and/or be displayed based on information entered by the user (e.g., using region 450 of GUI 400) and/or stored in a task database 112 (e.g., in column 205).

As shown in FIG. 5, column 523 of region 520 includes one or more users that a task is shared with. For example, the task "finish chores" may be shared with another user (e.g., "User 2"). It should be appreciated that sharing of a task may be independent of assignment of a task in one embodiment, and therefore, one or more shared tasks may either be assigned or unassigned. In one embodiment, information displayed in column 523 may correspond to and/or be displayed based on information entered by the user (e.g., using region 460 of GUI 400) and/or stored in a task database 112 (e.g., in column 206).

Column 524 includes an indication of whether one or more tasks have been completed. For example, the check mark displayed in column 524 may indicate that the task "finish chores" has been completed. In one embodiment, information displayed in column 524 may correspond to and/or be displayed based on information entered by the user (e.g., using region 470 of GUI 400) and/or stored in task database 112 (e.g., in column 208).

Accordingly, GUI 500 may be used to display one or more tasks associated with a user (e.g., created by a user, assigned to at least one other user, shared with at least one other user, etc.). GUI 500 may also be used to provide feedback to the user related to the status of one or more tasks (e.g., completed, incomplete, etc.).

Although FIG. 5 depicts regions of GUI 500 with specific sizes and shapes, it should be appreciated that GUI 500 may include regions of different sizes and/or shapes in other embodiments. Additionally, although FIG. 5 depicts a specific number and arrangement of regions, it should be appreciated that GUI 500 may include a different number and/or arrangement of regions in other embodiments.

Figure 6:
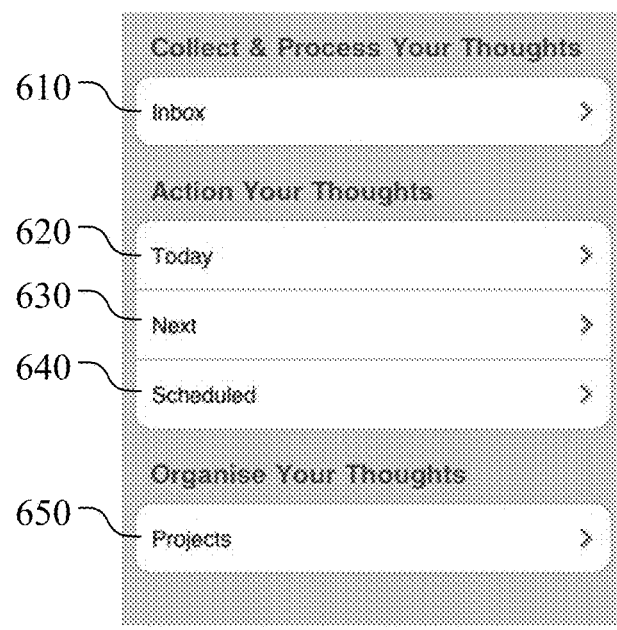
FIG. 6 shows an exemplary on-screen graphical user interface for managing tasks in accordance with one embodiment of the present invention.

FIG. 6 shows exemplary on-screen GUI 600 for managing tasks in accordance with one embodiment of the present invention. In one embodiment, region 610 may enable a user to enter information about one or more tasks (e.g., by initiating a display of GUI 400 of FIG. 400). Region 610 may enable a user to display information about one or more tasks (e.g., by initiating a display of GUI 500 of FIG. 500) in one embodiment.

Region 620 may enable a user to view one or more tasks scheduled for the current day. A user may view the next task or tasks that are scheduled using region 630. Region 640 may enable a user to view one or more tasks scheduled for some time period in the future (e.g., the next week, next month, etc.).

As shown in FIG. 6, region 650 may enable tasks to be organized into one or more categories or projects. In this manner, region 650 may enable tasks to be grouped after they are defined or created (e.g., using GUI 400).

Although FIG. 6 depicts regions of GUI 600 with specific sizes and shapes, it should be appreciated that GUI 600 may include regions of different sizes and/or shapes in other embodiments. Additionally, although FIG. 6 depicts a specific number and arrangement of regions, it should be appreciated that GUI 600 may include a different number and/or arrangement of regions in other embodiments.

Figure 7:
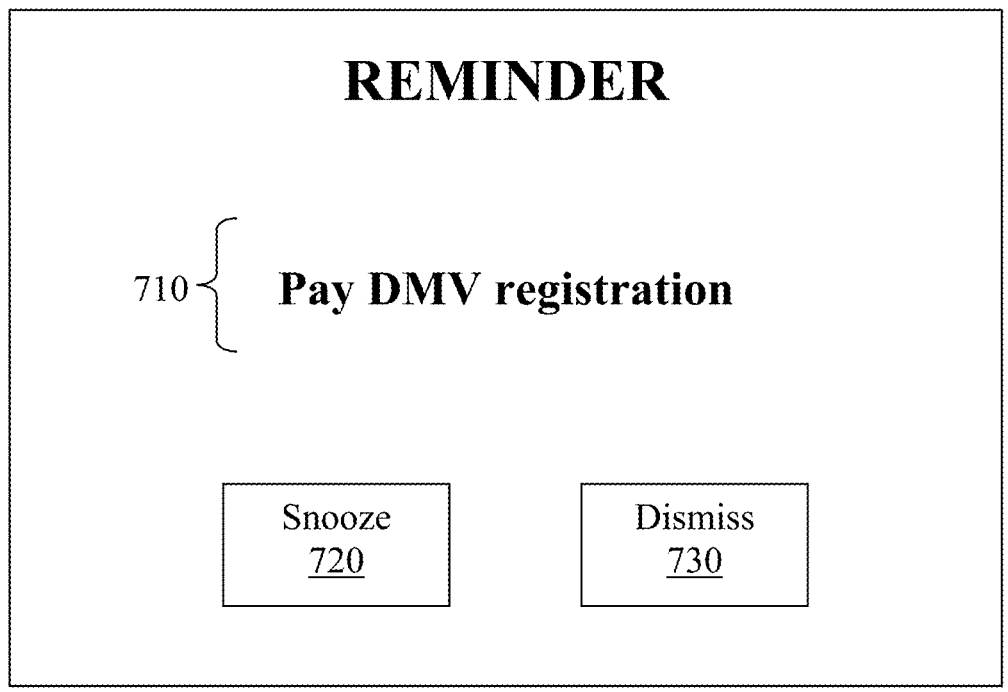
FIG. 7 shows an exemplary on-screen graphical user interface for providing a reminder to a user in accordance with one embodiment of the present invention.

FIG. 7 shows exemplary on-screen GUI 700 for providing a reminder to a user in accordance with one embodiment of the present invention. As shown in FIG. 7, region 710 of GUI 700 may include text associated with a description of a task (e.g., entered in region 420 of GUI 400). In one embodiment, region 710 may include one or more images associated with a task. Accordingly, region 710 may be displayed to remind a user to complete a task.

GUI 700 may be displayed in accordance with information (e.g., at least one time, at least one recipient of the at least one reminder, etc.) determined (e.g., in step 350 of process 300) based on at least one attribute (e.g., accessed in step 310 of process 300, determined in step 320 of process 300, etc.), information about a user (e.g., accessed in step 340 of process 300), at least one category associated with the task (e.g., assigned in step 330 of process 300), some combination thereof, etc. As such, GUI 700 may be displayed at a time that is relevant to completing the task (e.g., when a user is in a particular location enabling completion of the task, when the user is in communication with another user associated with completion of the task, etc.), thereby enabling the user to more easily and/or conveniently complete the task.

As shown in FIG. 7, region 720 may enable a user to "snooze" the reminder. For example, an interaction with region 720 may cause GUI 700 to be temporarily hidden and re-displayed at a later time. Region 730 may enable a user to dismiss the reminder. For example, an interaction with region 730 may cause GUI 700 to be hidden and not displayed at a later time.

Although FIG. 7 depicts regions of GUI 700 with specific sizes and shapes, it should be appreciated that GUI 700 may include regions of different sizes and/or shapes in other embodiments. Additionally, although FIG. 7 depicts a specific number and arrangement of regions, it should be appreciated that GUI 700 may include a different number and/or arrangement of regions in other embodiments. Further, although GUI 700 has been described as enabling at least one specific user input (e.g., a request to "snooze" a reminder, a request to dismiss a reminder, etc.), it should be appreciated that one or more of the at least one user input may be input via a multimedia interface (e.g., alone or in combination with GUI 700) in other embodiments.

FIG. 8 shows exemplary on-screen GUI 800 for providing a plurality of reminders to a user in accordance with one embodiment of the present invention. As shown in FIG. 8, region 810 of GUI 800 may include a listing of tasks to be completed by the user. In one embodiment, the tasks may be ranked or ordered based on one or more parameters.

In one embodiment, the tasks may be ordered based on a spatial ordering of locations associated with the tasks. For example, where a user is currently at work and is likely to be heading to the user's home (e.g., based on the current time of day and the past behavior of the user), then the tasks may be ordered based on the spatial ordering of the DMV and the grocery store. In this example, the user may pass the DMV before the grocery store on the way home from work, and thus, the first task associated with the DMV (e.g., "pay DMV registration") may be placed before the remaining two tasks associated with the grocery store (e.g., "get milk from store" and "get eggs from store"). In this manner, tasks may be ordered (e.g., using location information about the user, location information about the tasks, etc.) to increase the effectiveness of the reminder to the user and/or to facilitate completion of the tasks.

On-screen GUI 800 may be displayed in accordance with information (e.g., at least one time, at least one recipient of the at least one reminder, etc.) determined (e.g., in step 350 of process 300) based on at least one attribute (e.g., accessed in step 310 of process 300, determined in step 320 of process 300, etc.), information about a user (e.g., accessed in step 340 of process 300), at least one category associated with the tasks (e.g., assigned in step 330 of process 300), some combination thereof, etc. As such, GUI 800 may be displayed at a time that is relevant to completing the tasks (e.g., when a user is in a particular location enabling completion of the task, when the user is in communication with another user associated with completion of the task, etc.), thereby enabling the user to more easily and/or conveniently complete the tasks.

In one embodiment, parameters other than location may be used to order tasks. For example, tasks may be ordered based on a respective importance of each task (e.g., assigned by a user, automatically determined, etc.), past behavior and/or usage data for the user, etc.

As shown in FIG. 8, region 820 may enable a user to "snooze" the reminder. For example, an interaction with region 820 may cause GUI 800 to be temporarily hidden and re-displayed at a later time. Region 830 may enable a user to dismiss the reminder. For example, an interaction with region 830 may cause GUI 800 to be hidden and not displayed at a later time.

Although FIG. 8 depicts regions of GUI 800 with specific sizes and shapes, it should be appreciated that GUI 800 may include regions of different sizes and/or shapes in other embodiments. Additionally, although FIG. 8 depicts a specific number and arrangement of regions, it should be appreciated that GUI 800 may include a different number and/or arrangement of regions in other embodiments. Further, although GUI 800 has been described as enabling at least one specific user input (e.g., a request to "snooze" a reminder, a request to dismiss a reminder, etc.), it should be appreciated that one or more of the at least one user input may be input via a multimedia interface (e.g., alone or in combination with GUI 800) in other embodiments.

FIG. 9 shows exemplary on-screen GUI 900 for notifying at least one user of one or more tasks completed by at least one other user in accordance with one embodiment of the present invention. As shown in FIG. 9, region 910 of GUI 900 may include text associated with a description of a task (e.g., entered in region 420 of GUI 400), one or more images associated with a task, some combination thereof, etc. GUI 900 may be displayed responsive to detecting completion of one or more tasks by another user (e.g., as performed in step 370 of process 300). Accordingly, region 910 may be displayed to notify at least one user of one or more tasks completed by at least one other user.

In one embodiment, the at least one task associated with region 910 may be a task shared by a plurality of users. For example, where a plurality of users is sharing tasks related to grocery shopping, each user may receive a notification (e.g., via a display of GUI 900) responsive to one of the other users completing a task (e.g., associated with and/or listed in region 910). In this manner, duplication of effort related to completing tasks can be reduced, thereby enabling a group of users to more efficiently complete shared tasks.

In one embodiment, the at least one task associated with region 910 may be a task assigned from at least one user to at least one other user. For example, where a parent defines a task and causes the task to be assigned to a child, the parent may receive a notification (e.g., via a display of GUI 900) responsive to the child completing the task (e.g., associated with and/or listed in region 910). In this manner, at least one user may more conveniently monitor and/or track the status of tasks assigned to at least one other user.

Although FIG. 9 depicts regions of GUI 900 with specific sizes and shapes, it should be appreciated that GUI 900 may include regions of different sizes and/or shapes in other embodiments. Additionally, although FIG. 9 depicts a specific number and arrangement of regions, it should be appreciated that GUI 900 may include a different number and/or arrangement of regions in other embodiments.

Figure 10:
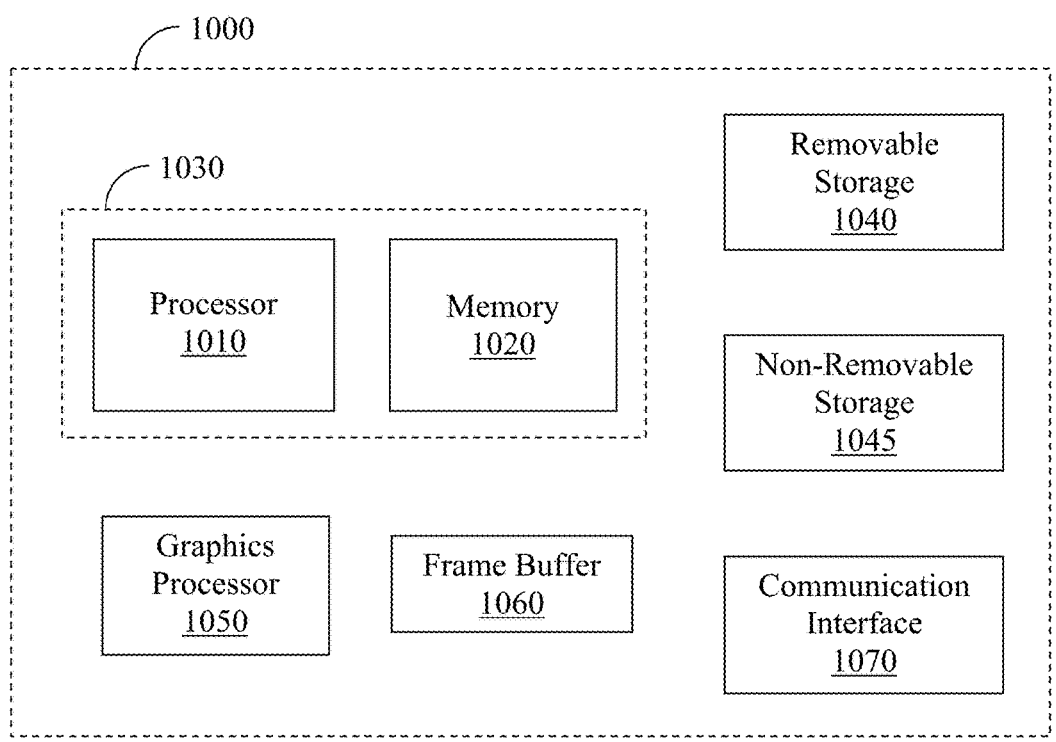
FIG. 10 shows an exemplary computer system platform upon which embodiments of the present invention may be implemented.

FIG. 10 shows exemplary general purpose computer system platform 1000 upon which embodiments of the present invention may be implemented. As shown in FIG. 10, portions of the present invention may be implemented by execution of computer-readable instructions or computer-executable instructions that may reside in components of computer system platform 1000 and which may be used as a part of a general purpose computer network. It is appreciated that computer system platform 1000 of FIG. 10 is merely exemplary. As such, the present invention can operate within a number of different systems including, but not limited to, general-purpose computer systems, embedded computer systems, laptop computer systems, hand-held computer systems, portable computer systems, or standalone computer systems.

In one embodiment, computer system platform 1000 may be used to implement system 110, computer system 120, computer system 130, computer system 140, remote system 150, some combination thereof, etc. And in one embodiment, one or more components of computer system platform 1000 may be disposed in and/or coupled with a housing or enclosure.

In one embodiment, depicted by dashed lines 1030, computer system platform 1000 may include at least one processor 1010 and at least one memory 1020. Processor 1010 may include a central processing unit (CPU) or other type of processor. Depending on the configuration and/or type of computer system environment, memory 1020 may include volatile memory (e.g., RAM), non-volatile memory (e.g., ROM, flash memory, etc.), or some combination of the two. Additionally, memory 1020 may be removable, non-removable, etc.

In other embodiments, computer system platform 1000 may include additional storage (e.g., removable storage 1040, non-removable storage 1045, etc.). Removable storage 1040 and/or non-removable storage 1045 may include volatile memory, non-volatile memory, or any combination thereof. Additionally, removable storage 1040 and/or non-removable storage 1045 may include CD-ROM, digital versatile disks (DVD) or other optical storage, magnetic cassettes, magnetic tape, magnetic disk storage or other magnetic storage devices, or any other medium which can be used to store information for access by computer system platform 1000.

As shown in FIG. 10, computer system platform 1000 may communicate with other systems, components, or devices via communication interface 1070. Communication interface 1070 may embody computer-readable instructions, data structures, program modules or other data in a modulated data signal (e.g., a carrier wave) or other transport mechanism. By way of example, and not limitation, communication interface 1070 may couple to wired media (e.g., a wired network, direct-wired connection, etc.) and/or wireless media (e.g., a wireless network, a wireless connection utilizing acoustic, radio frequency (RF), infrared, or other wireless signaling, etc.).

Communication interface 1070 may also couple computer system platform 1000 to one or more input devices (e.g., a keyboard, mouse, pen, voice input device, touch input device or touch screen, etc.). In one embodiment, communication interface 1070 may couple computer system platform 1000 to one or more output devices (e.g., a display, speaker, printer, etc.).

As shown in FIG. 10, graphics processor 1050 may perform graphics processing operations on graphical data stored in frame buffer 1060 or another memory (e.g., 1020, 1040, 1045, etc.) of computer system platform 1000. Graphical data stored in frame buffer 1060 may be accessed, processed, and/or modified by components (e.g., graphics processor 1050, processor 1010, etc.) of computer system platform 1000 and/or components of other systems/devices. Additionally, the graphical data may be accessed (e.g., by graphics processor 1050) and displayed on an output device coupled to computer system platform 1000. Accordingly, memory 1020, removable storage 1040, non-removable storage 1045, fame buffer 1060, or a combination thereof, may be a computer-readable medium or computer-usable medium and may include instructions that when executed by a processor (e.g., 1010, 1050, etc.) implement a method of providing reminders (e.g., in accordance with process 300 of FIG. 3), another method, some combination thereof, etc.

In the foregoing specification, embodiments of the invention have been described with reference to numerous specific details that may vary from implementation to implementation. Thus, the sole and exclusive indicator of what is, and is intended by the applicant to be, the invention is the set of claims that issue from this application, in the specific form in which such claims issue, including any subsequent correction. Hence, no limitation, element, property, feature, advantage, or attribute that is not expressly recited in a claim should limit the scope of such claim in any way. Accordingly, the specification and drawings are to be regarded in an illustrative rather than a restrictive sense.

What is claimed is:

1. A method of providing electronic reminders, said method comprising:
    accessing an attribute associated with a task;
    accessing information associated with a first user, wherein said task is assigned to said first user for execution, and wherein said task is generated by a second user;
    determining, based on said attribute and said information, a time for communicating an electronic reminder associated with said task to said first user,
    wherein said time occurs when a voice communication channel is established between a first electronic device associated with said first user and a second electronic device associated with said second user,
    wherein said first and second electronic devices are communicatively coupled together over said voice communication channel in a communication network;
    delivering over another communication channel of another communication network said electronic reminder to said first electronic device of said first user at said time;
    wherein said electronic reminder is sent in accordance with a rule accessed from a rule database;
    wherein said task is input via a graphical user interface by at least one other user;
    assigning said task to said first user, and wherein said at least one other user is free of responsibility for completing said task; and
    responsive to a completion of said task by said first user, communicating to said at least one other user a message that said task has been completed by said first user.

2. The method of claim 1, wherein said information associated with said first user comprises at least one other user in communication with said first user.

3. The method of claim 1 further comprising:
    accessing data associated with task; and
    parsing said data to determine said attribute.

4. The method of claim 1, wherein said task is input via a graphical user interface by said second user.

5. The method of claim 1, wherein said task is shared with a third user, and further comprising:
    responsive to a completion of said task by said third user, communicating to said first user a message that said task has been completed by said third user.

6. The method of claim 1 further comprising:
    assigning a category to said task, and
    wherein said determining further comprises automatically determining said time based at least in part on said category.

7. A non-transitory computer-readable medium having computer-readable program code embodied therein for causing a computer system to perform a method of providing electronic reminders, said method comprising:
    accessing an attribute associated with a task;
    accessing information associated with a first user wherein said task is assigned to said first user for execution, and wherein said task is generated by a second user;
    determining, based on said attribute and said information, a time for communicating an electronic reminder associated with said task to said first user,
    wherein said time occurs when a voice communication channel is established between a first electronic device associated with said first user and a second electronic device associated with said second user,
    wherein said first and second electronic devices are communicatively coupled together over said voice communication channel in a communication network;
    delivering over another communication channel of another communication network said electronic reminder to said first electronic device of said first user at said time;
    wherein said electronic reminder is sent in accordance with a rule accessed from a rule database;
    wherein said task is input via a graphical user interface by at least one other user;
    assigning said task to said first user, and wherein said at least one other user is free of responsibility for completing said task; and
    responsive to a completion of said task by said first user, communicating to said at least one other user a message that said task has been completed by said first user.

8. The computer-readable medium of claim 7, wherein said information associated with said first user is selected from a group consisting of: a location of said first user; and at least one other user in communication with said first user.

9. The computer-readable medium of claim 7, wherein said method further comprises:
    accessing data associated with task; and
    parsing said data to determine said attribute.

10. The computer-readable medium of claim 7, wherein said task is input via a graphical user interface by said second user.

11. The computer-readable medium of claim 7, wherein said task is shared with a third user, and wherein said method further comprises:
    responsive to a completion of said task by said third user, communicating to said first user a message that said task has been completed by said third user.

12. The computer-readable medium of claim 7, wherein said method further comprises:
    assigning a category to said task, and
    wherein said determining further comprises automatically determining said time based at least in part on said category.

13. A system comprising a processor and a memory, wherein said memory comprises instructions that when executed by said system implement a method of providing an electronic reminder, said method comprising:
  accessing an attribute associated with a task;
  accessing information associated with a first user, wherein said task is assigned to said first user for execution, and wherein said task is generated by a second user;
  responsive to establishing voice communication between a first electronic device associated with said first user and a second electronic device associated with said second user over a voice communication channel of a voice communication network, delivering over another communication channel of another communication network said electronic reminder to said first electronic device of said first user,
  wherein said task is ordered based on a spatial ordering of locations associated with a plurality of tasks,
  wherein said task is input via a graphical user interface by at least one other user;
  assigning said task to said first user, and wherein said at least one other user is free of responsibility for completing said task; and
  responsive to a completion of said task by said first user, communicating to said at least one other user a message that said task has been completed by said first user.

14. The system of claim 13, wherein said information associated with said first user is selected from a group consisting of: a location of said first user; and at least one other user in communication with said first user.

15. The system of claim 13, wherein said method further comprises:
  accessing data associated with task; and
  parsing said data to determine said attribute.

16. The system of claim 13, wherein said task is input via a graphical user interface by said second user.

17. The system of claim 13, wherein said task is shared with a third user, and wherein said method further comprises:
  responsive to a completion of said task by said third user, communicating to said first user a message that said task has been completed by said third user.

18. The system of claim 13, wherein said method further comprises:
  assigning a category to said task, and
  wherein said determining further comprises automatically determining said time based at least in part on said category.

* * * * *